(12) United States Patent
Bisplinghoff et al.

(10) Patent No.: US 8,214,984 B2
(45) Date of Patent: Jul. 10, 2012

(54) METHOD FOR PRODUCING A MULTILAYER COMPONENT

(75) Inventors: Gerhard Bisplinghoff, Deutschlandsberg (AT); Axel Pecina, St. Martin (AT)

(73) Assignee: EPCOS AG, Munich (DE)

( * ) Notice: Subject to any disclaimer, the term of this patent is extended or adjusted under 35 U.S.C. 154(b) by 163 days.

(21) Appl. No.: 12/719,547

(22) Filed: Mar. 8, 2010

(65) Prior Publication Data

US 2010/0202097 A1    Aug. 12, 2010

Related U.S. Application Data

(63) Continuation of application No. PCT/EP2008/061940, filed on Sep. 9, 2008.

(30) Foreign Application Priority Data

Sep. 10, 2007   (DE) .................. 10 2007 043 098

(51) Int. Cl.
    *H01G 7/00*    (2006.01)
(52) U.S. Cl. ............... 29/25.42; 29/25.41; 29/25.03; 361/321.2
(58) Field of Classification Search ...... 29/15.41–25.42, 29/854–855; 361/321.2–321.3, 328
See application file for complete search history.

(56) References Cited

U.S. PATENT DOCUMENTS

| | | | |
|---|---|---|---|
| 3,679,950 A * | 7/1972 | Rutt | 361/321.4 |
| 3,811,937 A * | 5/1974 | Maher | 428/434 |
| 3,815,187 A | 6/1974 | Hanold, III | |
| 4,982,485 A | 1/1991 | Nakaya et al. | |
| 5,312,581 A | 5/1994 | Amano et al. | |
| 5,735,027 A * | 4/1998 | Hageman et al. | 29/25.35 |
| 5,759,480 A | 6/1998 | Hennings et al. | |
| 6,118,647 A * | 9/2000 | Okinaka et al. | 361/305 |
| 6,245,433 B1 | 6/2001 | Nakamura et al. | |
| 6,898,071 B2 * | 5/2005 | Kirsten | 361/307 |
| 7,276,841 B2 | 10/2007 | Takaoka et al. | |
| 2006/0232170 A1 | 10/2006 | Takaoka et al. | |

FOREIGN PATENT DOCUMENTS

| | | |
|---|---|---|
| DE | 2 334 444 A1 | 1/1974 |
| DE | 39 30 623 A1 | 3/1990 |
| DE | 699 28 873 T2 | 8/2006 |
| EP | 0 716 054 A2 | 6/1996 |
| EP | 1 701 391 A1 | 9/2006 |

* cited by examiner

*Primary Examiner* — Minh Trinh
(74) *Attorney, Agent, or Firm* — Slater & Matsil, L.L.P.

(57) ABSTRACT

A method for producing a multilayer component is described. A stack of green foils, to which inner electrodes including palladium oxide are applied, is sintered. The sintered stack is provided with a silver paste on two or more sides for outer electrodes that are burned into the sintered stack in a further temperature step.

20 Claims, 1 Drawing Sheet

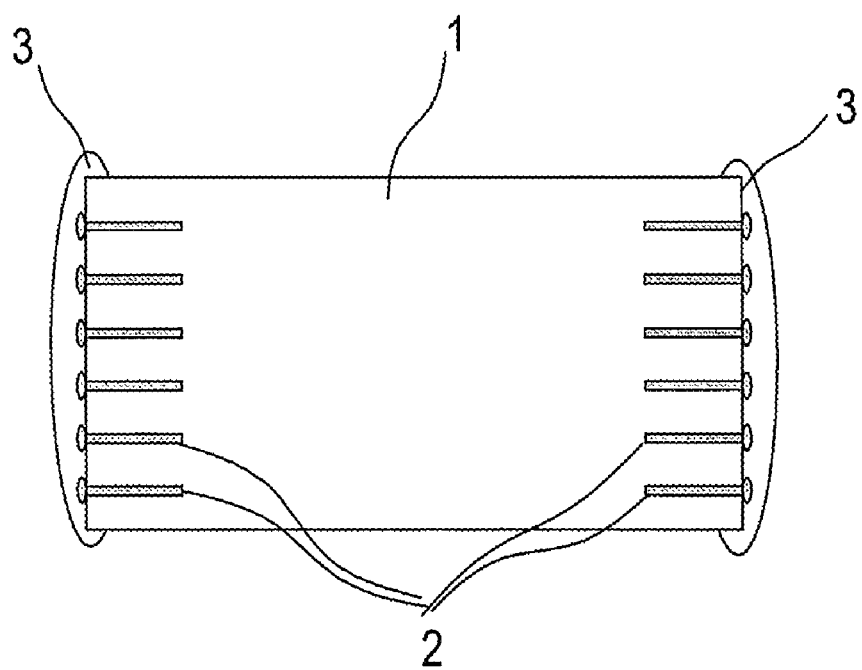

METHOD FOR PRODUCING A MULTILAYER COMPONENT

This application is a continuation of co-pending International Application No. PCT/EP2008/061940, filed Sep. 9, 2008, which designated the United States and was not published in English, and which claims priority to German Application No. 10 2007 043 098.3 filed Sep. 10, 2007, both of which applications are incorporated herein by reference.

TECHNICAL FIELD

The invention relates to a method for producing a multilayer component.

SUMMARY

In one aspect, a multilayer component is disclosed along with a method for producing a multilayer component, wherein tensions in the interior of the multilayer component during production are avoided or minimized.

BRIEF DESCRIPTION OF THE DRAWINGS

The drawing described below is not to be viewed as being true to scale. Rather, individual dimensions can be enlarged, reduced, or distorted for better visibility.

Elements that are identical to each other, or that undertake the same function, are designated by the same reference numeral.

The lone FIGURE shows an embodiment of the multilayer component, wherein outer electrodes are burned in on the sintered multilayer component.

The following list of reference symbols may be used in conjunction with the drawing:
1 Multilayer component
2 Inner electrodes
3 Outer electrodes

DETAILED DESCRIPTION OF ILLUSTRATIVE EMBODIMENTS

A method for producing a multilayer component is disclosed, wherein interior electrodes made of palladium oxide are applied to green foils in a first process step. The palladium oxide is applied to the green foils by means of a paste. The paste has a solids content of between 30% and 80%. The solids content preferably comprises 100% palladium oxide, but the content of palladium oxide can also be lower. A plurality of green foils are stacked and then divided into individual green stacks.

The stacks of green foils having inner electrodes made of palladium oxide applied thereto are then sintered. The sintered stacks are provided on two or more sides with a silver paste for outer electrodes that are burned into the sintered stack in a further temperature step.

During the sintering process, the palladium oxide printed onto the green foils is converted to palladium. During the sintering process, re-formation of metallic palladium occurs above approximately 800° C., so that the palladium oxide is converted to metallic palladium. Because a volume contraction occurs during the sintering step, due to the sintering process, which is approximately simultaneous with the conversion of palladium oxide to palladium, tensions in the individual layers during the sintering process can be reduced by using palladium oxide as the starting electrode material.

The volume of palladium oxide remains stable up to approximately 800° C. When metallic non-oxidized palladium is used as the starting electrode material, the volume of the palladium expands during the sintering process, that is, also below 800° C., and expansion in volume of the palladium on oxidation of the palladium to palladium oxide takes place, which causes tensions within the dielectric layers of the multilayer component during the sintering process.

The silver paste used for the outer electrodes preferably has a glass content. The glass content in the silver paste serves as an adhesive for attaching the outer electrodes to the sintered green stack.

In a preferred embodiment, the silver paste has a polymer content that fulfils the function of a binder.

During burning-in of the silver paste, silver diffuses out of the outer electrodes into the inner electrodes. The palladium preferably diffuses out of the inner electrodes into the outer electrodes during the burning-in of the silver paste.

A concentration gradient is thus formed by the preferably silver-containing outer electrodes, which provides for a drop in palladium concentration in the outer electrodes. Due to the drop in concentration, diffusion of palladium from the inner electrode into the silver-containing outer electrode is enhanced. Palladium thereby passes from the inner electrodes to the outer electrodes. The excess concentration of silver in the outer electrodes leads to a concentration gradient of silver in the direction of the inner electrodes. The concentration gradient therefore enhances diffusion of silver from the outer electrodes into the edge regions of the inner electrodes.

In a preferred embodiment, the inner electrodes of the multilayer component have a palladium content of 20% by weight after sintering.

The method described above is preferably used, inter alia, for NTCs, varistors, capacitors, or other multilayer components.

The method described is explained in more detail using the FIGURE and an example embodiment.

The FIGURE shows an embodiment of the multilayer component, wherein outer electrodes 3 are burned in on the sintered multilayer component 1. The multilayer component 1 has dielectric layers that are provided with inner electrodes 2. The palladium oxide that was applied to green foils was converted to palladium during the sintering process. Tensions in the multilayer component during sintering is reduced by the palladium oxide, which is stable in volume up to approximately 800° C., applied to the inner electrodes 2. From approximately 800° C., the palladium oxide changes into metallic palladium. From the temperature, however, the volume contraction of the stack of green foils is already largely complete, so that further increases in temperature do not cause further tensions within the multilayer component. The outer electrodes 3 comprise silver, which diffuses into the inner electrodes 2 due to the concentration gradient that is present. The palladium of the inner electrodes also diffuses into the outer electrodes due to the concentration gradient to the same.

Although it was only possible to describe a limited number of potential refinements of the invention in the embodiments, the invention is not limited to the same.

The invention is not limited to the number of elements shown.

The description provided here is not limited to the individual special embodiments. Rather, the characteristics of the individual embodiments can be combined with each other arbitrarily, to the extent technically feasible.

What is claimed is:

1. A method for producing a multilayer component, the method comprising:
   applying palladium oxide to a stack of green foils having inner electrodes, the palladium oxide being applied by a paste having a solids content between 30% and 80%, the solids content comprising palladium oxide;
   sintering the stack,
   providing the sintered stack with a silver paste on two or more sides for outer electrodes, and
   burning the silver paste into the sintered stack in a further temperature step.

2. The method according to claim 1, wherein palladium oxide is converted to palladium during the sintering process.

3. The method according to claim 1, wherein the silver paste comprises a glass content.

4. The method according to claim 1, wherein the silver paste comprises a polymer content.

5. The method according to claim 1, wherein silver diffuses out of the outer electrodes into the inner electrodes during the burning-in of the silver paste.

6. The method according to claim 1, wherein palladium diffuses out of the inner electrodes into the outer electrodes during the burning-in of the silver paste.

7. The method according to claim 1, wherein the inner electrodes of the multilayer component comprise a palladium content of 20% by weight after sintering.

8. The method according to claim 1, wherein the paste comprises 100% palladium oxide.

9. The method according to claim 1, wherein the sintering is performed at a temperature greater than about 800° C.

10. The method according to claim 1, wherein the solids content comprises 100% palladium oxide.

11. The method according to claim 1, wherein the solids content comprises less than 100% palladium oxide.

12. A method for producing a multilayer component, the method comprising:
   providing a stack of green foils having inner electrodes comprising palladium oxide applied thereto,
   sintering the stack,
   providing the sintered stack with a silver paste on two or more sides for outer electrodes, and
   burning the silver paste into the sintered green stack in a further temperature step,
   wherein providing the stack of green foils comprises providing green foils with palladium oxide applied by means of a paste, and
   wherein the paste has a solids content of between 30% and 80%.

13. The method according to claim 12, wherein the solids content comprises 100% palladium oxide.

14. The method according to claim 12, wherein the solids content comprises less than 100% palladium oxide.

15. The method according to claim 12, wherein palladium oxide is converted to palladium during the sintering process.

16. The method according to claim 12, wherein the silver paste comprises a glass content.

17. The method according to claim 12, wherein the silver paste comprises a polymer content.

18. The method according to claim 12, wherein silver diffuses out of the outer electrodes into the inner electrodes during the burning of the silver paste.

19. The method according to claim 12, wherein palladium diffuses out of the inner electrodes into the outer electrodes during the burning of the silver paste.

20. The method according to claim 12, wherein the inner electrodes of the multilayer component comprise a palladium content of 20% by weight after sintering.

* * * * *